United States Patent [19]
Bivens

[11] Patent Number: 5,731,024
[45] Date of Patent: Mar. 24, 1998

[54] CONTINUOUS FILTERING AND TREATING DEVICE AND METHOD WITH EXTERNAL TREATING MECHANISM

[76] Inventor: Thomas H. Bivens, 6907 FM 1488, Magnolia, Tex. 77355-1250

[21] Appl. No.: 784,371

[22] Filed: Jan. 17, 1997

Related U.S. Application Data

[63] Continuation-in-part of Ser. No. 236,890, May 2, 1994, Pat. No. 5,595,107.

[51] Int. Cl.$^6$ .............................. A47J 37/00; A47J 37/12; C11B 5/00
[52] U.S. Cl. .............................. 426/417; 99/330; 99/403; 99/408; 210/167; 210/DIG. 8; 426/438
[58] Field of Search .................. 99/330, 403, 407, 99/408–410; 210/167, 461, 486, 489, DIG. 8; 126/351, 374, 391; 236/26 A; 134/111, 166 R; 426/417, 438

[56] References Cited

U.S. PATENT DOCUMENTS

| Re. 34,636 | 6/1994 | Bivens. |
|---|---|---|
| 445,223 | 1/1891 | Knight. |
| 2,359,368 | 10/1944 | Klopfenstein. |

(List continued on next page.)

FOREIGN PATENT DOCUMENTS

| 2146547 | 9/1984 | United Kingdom. |
|---|---|---|
| 91/12304 | 2/1991 | WIPO. |
| 93/17567 | 3/1993 | WIPO. |

OTHER PUBLICATIONS

"New! Permafil Oil Filter"; Filtration International, Inc., Houston, Texas; date unknown.
"Permafil" Brochure; Edible Oil Division, Houston, Texas; date unknown.
Re Nu Brochure, Re Nu Vacuum Filter Manufacturing Company; date unknown.
R.F. Hunter, Co., Inc. Brochure; date unknown.
Robot Coupe USA, Inc. Brochure; date unknown.
Castle Filter Brochure, The Prince Castle Co.; date unknown.
Fastfilter Assembly and Operating Instructions; date unknown.
Custom Built-In Micro-Flo Oil Filtration, Dean/Alco; Nov. 1984.
The Filter Magic System by Frymaster Wellbilt Co. Bulletin No. 818-001 Rev/ Nov. 1986; date unknown.

*Primary Examiner*—Timothy F. Simone
*Attorney, Agent, or Firm*—Keeling Law Firm

[57] ABSTRACT

A continuous and concurrent filtering and treating device and method with an external treating device, comprising a filtering mechanism immersed in a fryer filled with cooking oil, a treating mechanism situated external to said tank, and a suction pump which draws cooking oil from the fryer through the filtering mechanism, through the treating mechanism, and pumps it back into the fryer. The filtering mechanism comprises a wire mesh envelope, including at least one wire mesh filter screen for filtering the cooking oil, an insert disposed within the wire mesh envelope supporting the wire mesh envelope and providing fluid communication therethrough, and a frame which holds the wire mesh envelope and the insert together. The treating mechanism comprises a vessel in one embodiment and a container in an alternative embodiment and is provided with an inlet and an outlet and a selectively removably attached top. Treating material is disposed within the treating mechanism and comprises any material, such as activated carbon, which upon contact with the cooking oil can extend the usable life of the cooking oil.

25 Claims, 6 Drawing Sheets

U.S. PATENT DOCUMENTS

| | | |
|---|---|---|
| 2,424,211 | 7/1947 | Webb . |
| 2,610,740 | 9/1952 | Hunter . |
| 2,635,527 | 4/1953 | Overbeck et al. . |
| 2,760,641 | 8/1956 | Mies, Jr. et al. . |
| 3,147,220 | 9/1964 | Avery . |
| 3,159,095 | 12/1964 | Wagner . |
| 3,263,818 | 8/1966 | Gedrich . |
| 3,279,605 | 10/1966 | Shepherd . |
| 3,667,374 | 6/1972 | Holmes . |
| 3,735,871 | 5/1973 | Bisko . |
| 4,113,623 | 9/1978 | Koether et al. . |
| 4,328,097 | 5/1982 | Whaley et al. . |
| 4,591,434 | 5/1986 | Prudhomme . |
| 4,604,203 | 8/1986 | Kyle . |
| 4,623,456 | 11/1986 | Ratner . |
| 4,666,594 | 5/1987 | Schneider . |
| 4,804,466 | 2/1989 | Cooper et al. . |
| 4,805,525 | 2/1989 | Bivens . |
| 4,828,694 | 5/1989 | Leason . |
| 4,945,893 | 8/1990 | Manchester . |
| 4,968,518 | 11/1990 | Lopez . |
| 4,988,440 | 1/1991 | Bernard et al. . |
| 5,049,274 | 9/1991 | Leason et al. . |
| 5,075,000 | 12/1991 | Bernard et al. . |
| 5,143,604 | 9/1992 | Bernard et al. . |
| 5,247,876 | 9/1993 | Wilson et al. . |
| 5,354,455 | 10/1994 | Burklund et al. . |
| 5,404,799 | 4/1995 | Bivens . |
| 5,458,772 | 10/1995 | Eskes et al. . |
| 5,486,370 | 1/1996 | Bivens . |
| 5,595,107 | 1/1997 | Bivens ......................... 99/408 |

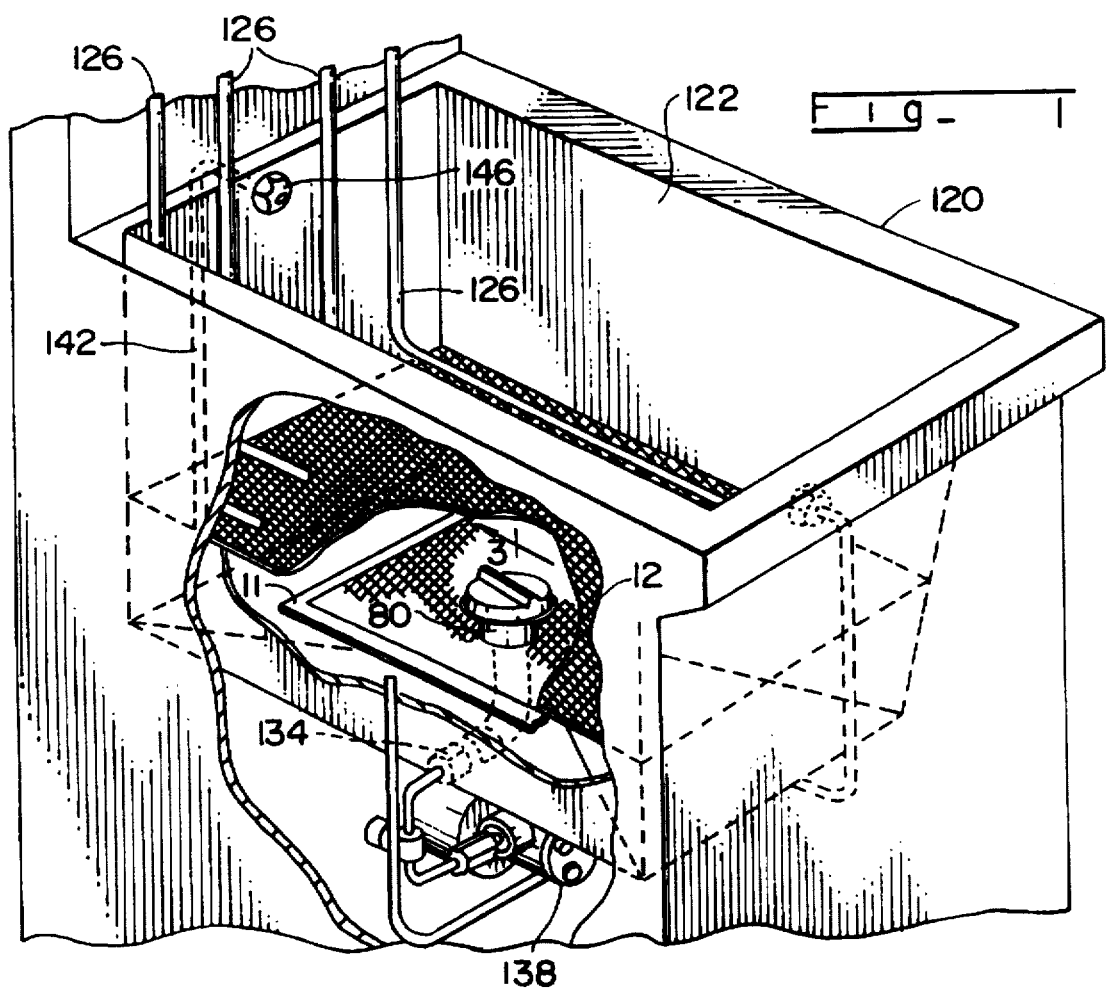

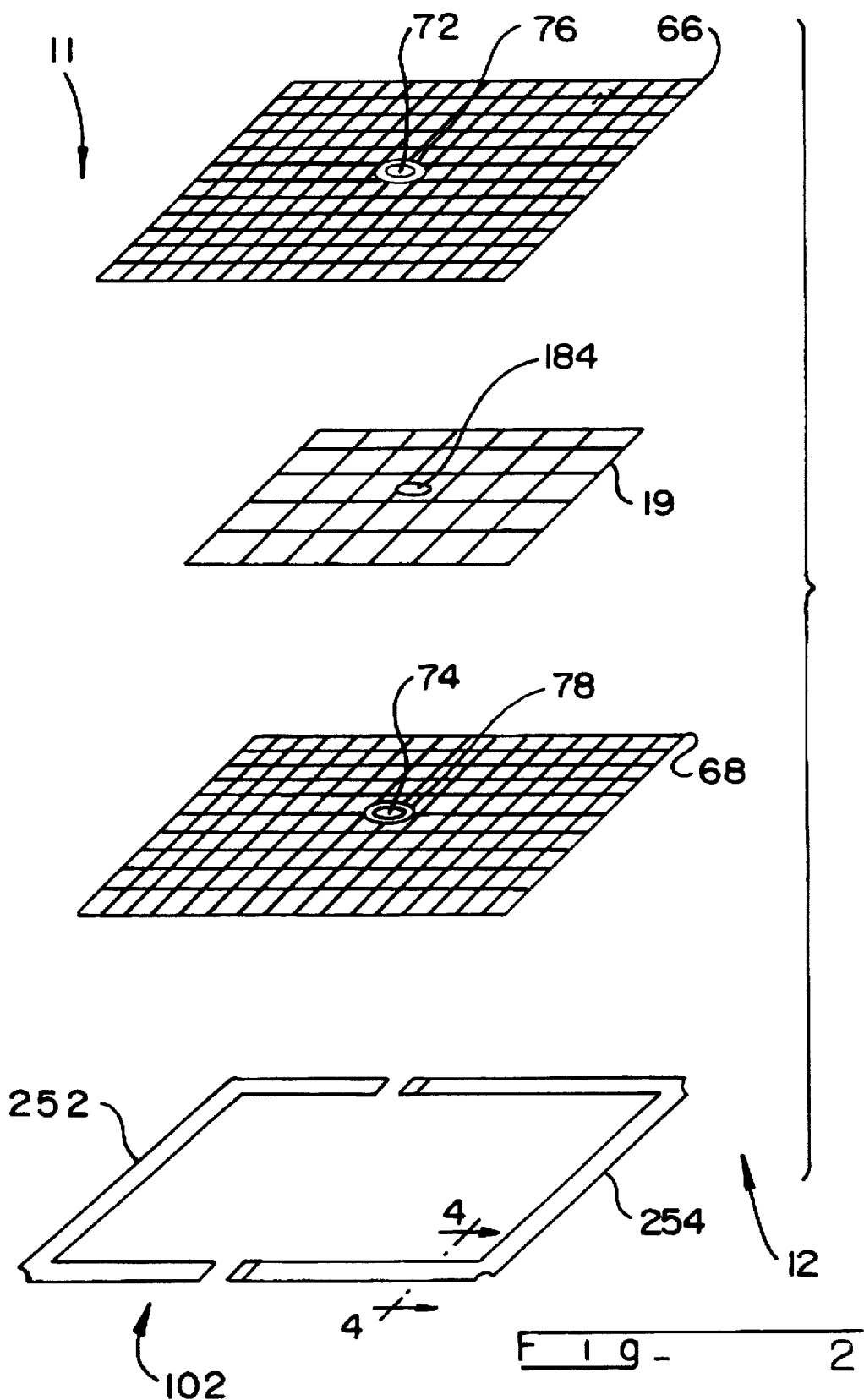

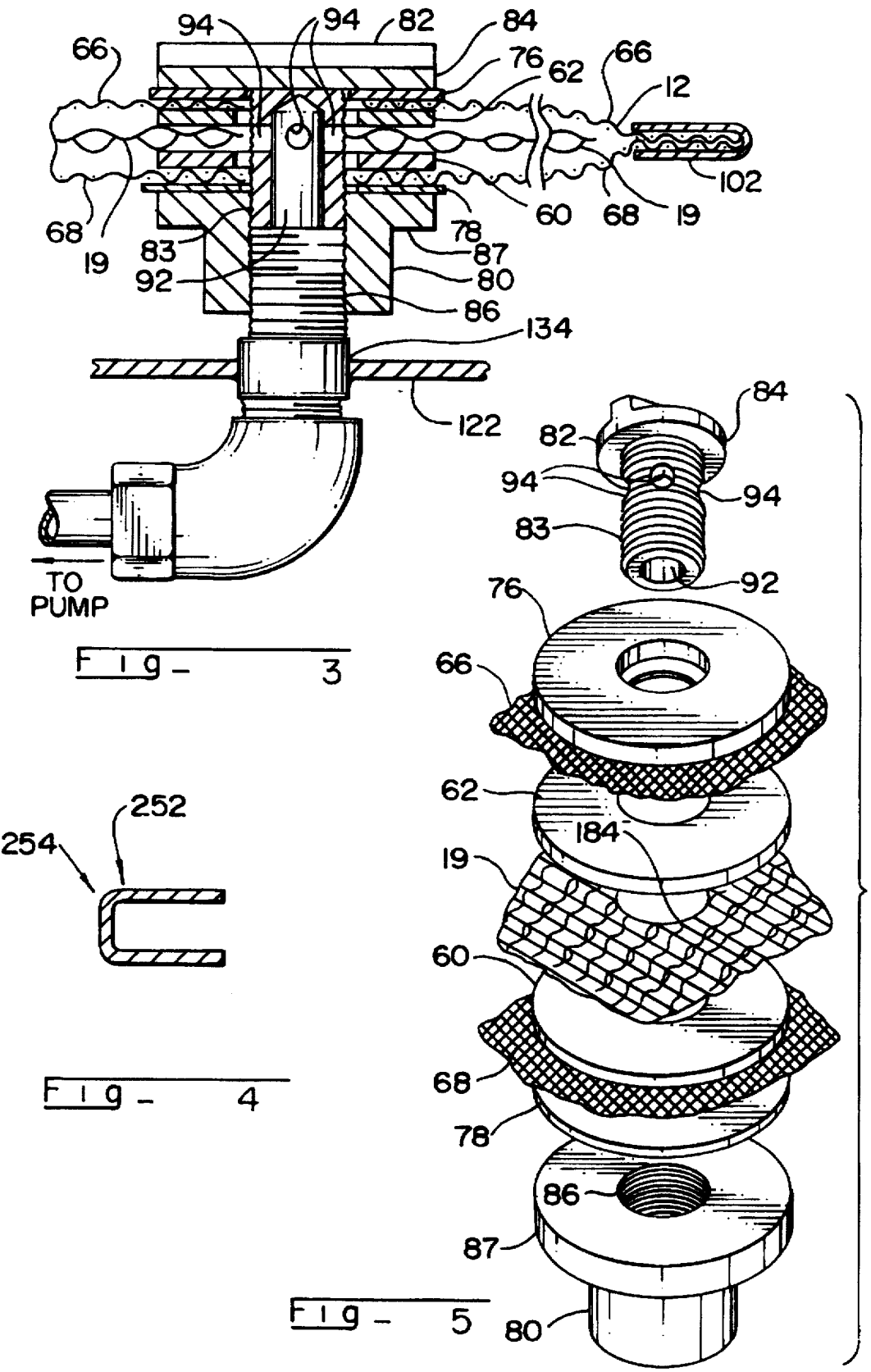

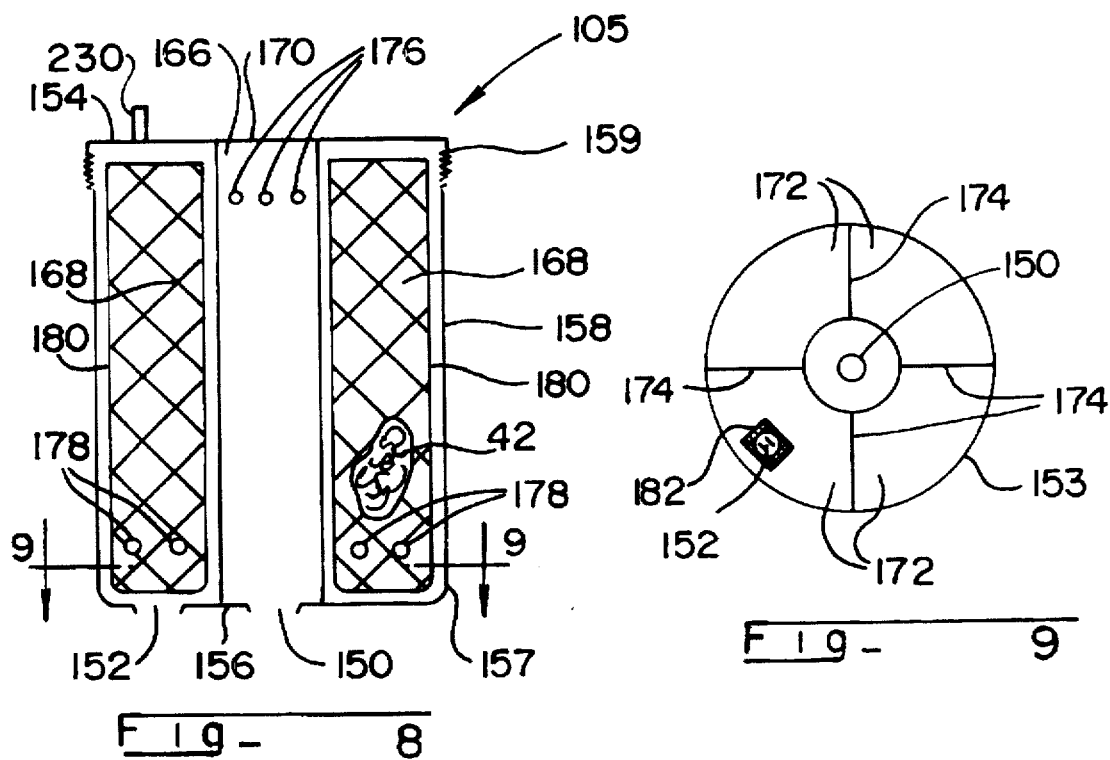
Fig-8
Fig-9
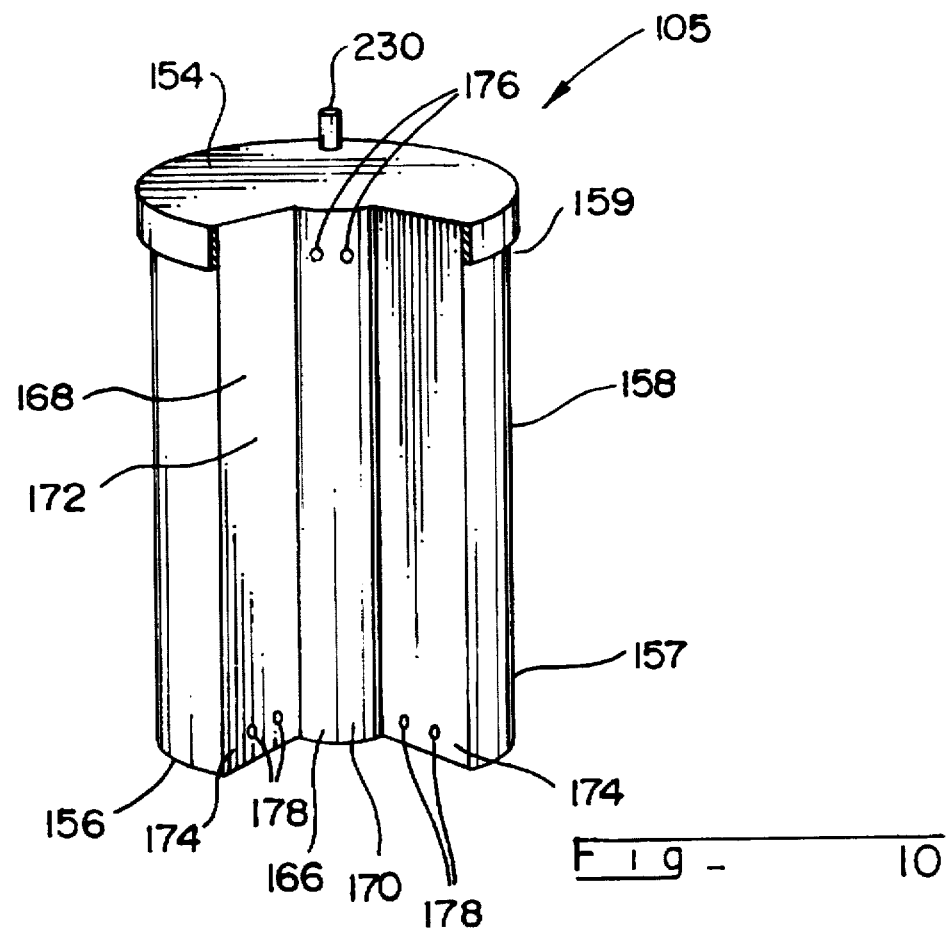
Fig-10

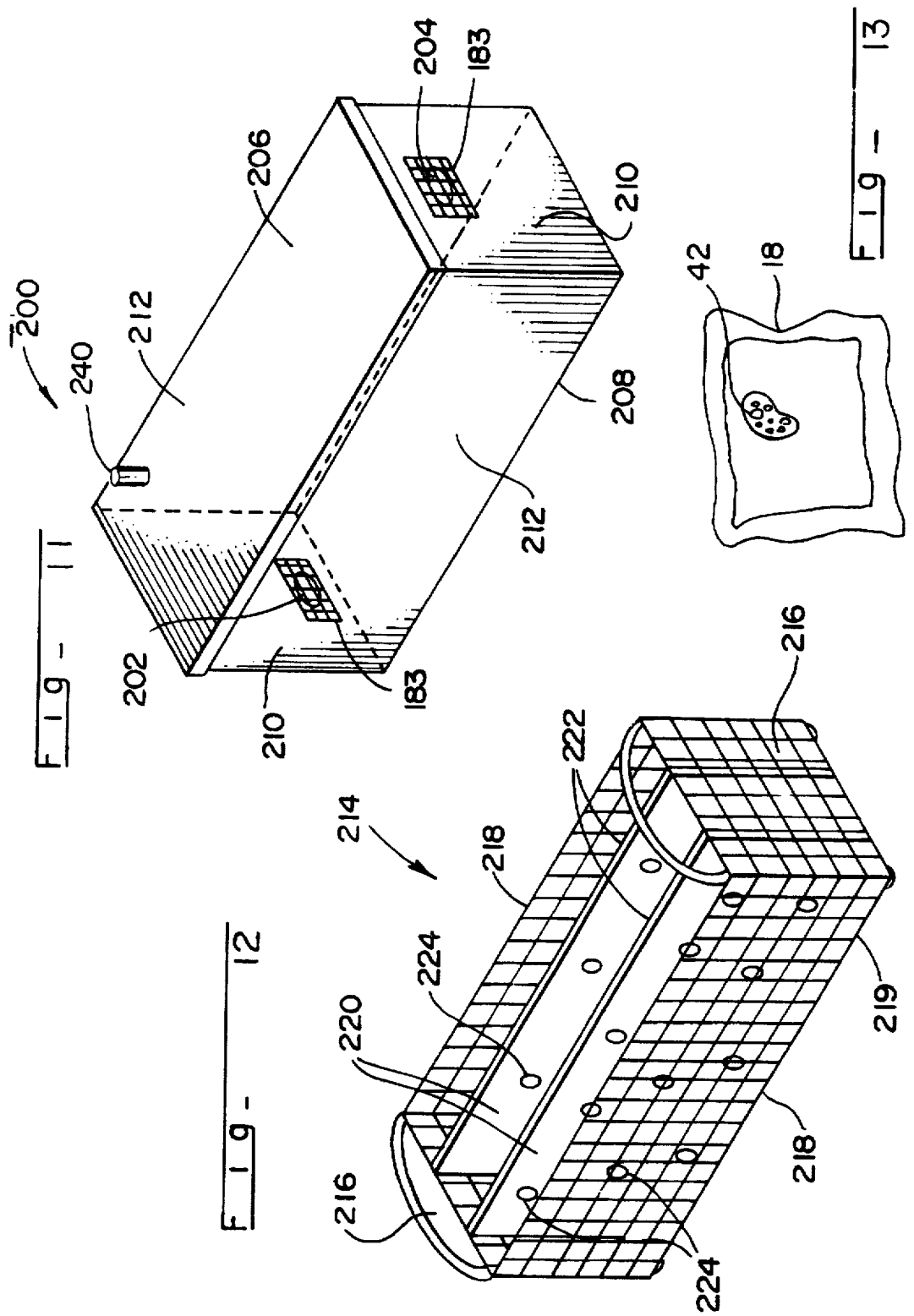

CONTINUOUS FILTERING AND TREATING DEVICE AND METHOD WITH EXTERNAL TREATING MECHANISM

This application is a continuation in part of Ser. No. 08/236,890, filed by Bivens on May 2, 1994 now U.S. Pat. No. 5,595,107.

BACKGROUND OF THE INVENTION

1. Field of Invention

The present invention relates generally to devices and systems capable of filtering and treating liquids. More specifically, the present invention relates to such devices and systems used to independently, concurrently, and continuously filter and treat cooking oil in fryers.

Fryers are extensively used in the food industry to cook various comestibles. A common type of fryer includes a relatively deep container with the comestible to be cooked immersed in cooking oil in the container. The food industry utilizes substantial quantities of cooking oil in cooking fryers. Extending the usable life of cooking oil would substantially reduce the amount of money spent by the food industry on oil and would thus provide the industry a substantial economic benefit.

However, the cooking and heating processes continually alter and degrade the physical and chemical properties of cooking oil thereby reducing the useful life of the oil. Examples of contributors to the alteration and degradation of the cooking oil are food particles that become dislodged from the food during the cooking process and thereafter remain in the oil, water and fats that are extracted from the food during the cooking process and also remain in the oil thereafter, and free fatty acids that form when heat, water, and oxygen act upon and chemically alter the cooking oil (collectively referred to as "the contributors").

The food particles, if not removed from the cooking oil, will eventually become charred and will impart unwanted tastes, odors, and dark color to the oil. Free fatty acids contribute to the degradation of the cooking oil in that as the percentage of free fatty acids in the cooking oil increases, the smoke, flash, and fire points of the cooking oil are reduced. A large reduction in the smoke, flash, and fire points of the cooking oil may result in a fire hazard and/or may cause excessive smoke emissions. The presence of any of these contributors may, by itself, be cause to replace degraded, used oil with new oil.

In order to prolong the usable life of cooking oil, it is thus productive to neutralize and limit the presence and effects of the contributors by continuously filtering the oil to remove the charred food particles and continuously treating the oil to neutralize some of the chemical alterations generated by the contributors.

In addition, the continuous filtration of cooking oil during the cooking process provides the benefit of reducing the cooking oil temperature and/or cooking time required as compared to operations which do not employ continuous filtration. Continuous filtration, in general, involves the continuous recirculation of oil in a system, pumping the oil out of the fryer and back into the fryer. This recirculation process which involves the turnover of the entire cooking oil in the fryer within a given time period imparts consistent cooking oil temperatures throughout the fryer. Uniform cooking oil temperatures throughout the fryer provides for the most efficient use of the energy required to maintain the necessary cooking oil temperature in the fryer zone where the oil and the food come into contact. Energy consumption in the fryer and its cooking oil is thus significantly reduced.

2. Related Art

In prior art systems, cooking oil is cleaned by pumping it through a filter assembly often containing filter paper or other disposable filter media. A filter powder is normally applied to the filter media by dispersal in the cooking oil. Filter powders commonly consist of diatomaceous earth, perlite or magnesium silicate. In the filtration process, filter powders form a coating on the surface of filter media and thereby mechanically strain suspended solids from liquids.

In such prior art systems, filtration with the aid of filter powder takes place only after the cooking process is interrupted and the cooking oil is allowed to cool. This type of "intermittent" or "batch" filtration can necessarily only filter the oil after the contributors have been created and have already adversely affected the cooking oil and the food. Thus, the benefits of "intermittent" or "batch" filtration are limited.

U.S. Re-Issue Pat. No. 34,636 to the present inventor discloses a cooking oil filtering apparatus for removal of particulates from cooking oil. Cooking oil is drawn through wire mesh screens supported outside a filter insert by applying a suction interior of the wire mesh screens. The subject apparatus eliminates the need for filter paper. The subject apparatus, like the previously described prior art, contemplates only "intermittent" or "batch" filtration.

This applicant's U.S. Pat. No. 5,404,799 discloses a continuous filtering fryer, the continuous filtering fryer comprising a filtering element including wire mesh screens disposed adjacent the bottom of the fryer supported outside a filter insert, an outlet line from the filter insert to a suction pump, the pump drawing cooking oil through the wire mesh screens and returning the cooking oil to the container. Such apparatus allows continuous filtering during the cooking operation.

The prior art does not disclose a device having the characteristics of providing filtration of cooking oil and concurrently treating the cooking oil by exposing it to materials which extend the usable life of the cooking oil.

This applicant's copending U.S. application Ser. No. 08/236,890 now U.S. Pat. No. 5,595,107 discloses a filtering and treating device including an external wire mesh filter screen, an inner, rigid, perforated support shell, and a centrally-disposed spool, the spool including fluid channels connectable to a suction pump. The shell and the interior walls define compartments to retain treating materials, such as activated carbon, which extend the usable life of the cooking oil. The suction pump draws liquid from outside the wire mesh envelope through the support shell, through the support shell compartments and treating material and through the central spool. Thus, the claimed device is capable of continuously and concurrently filtering and treating cooking oil during the cooking operation.

However, it has been observed by the applicant that the amount of and therefore the effectiveness and efficiency of the treating material of the device claimed in U.S. application Ser. No. 08/236,890 now U.S. Pat. No. 5,595,107 is constrained and limited by the size of the compartments defined by the support shell. In turn, the size of the support shell and its compartments is restricted by the limited amount of space available in various models of fryers.

SUMMARY OF THE INVENTION

It is an object of the present invention to provide a continuous and concurrent filtering and treating device and system.

It is another object of the present invention to provide a continuous and concurrent filtering and treating device and system in which the amount, effectiveness, efficiency and performance of the treating material is not limited by the dimensions of the fryer container cavity.

It is another object of the present invention to provide a device and system for continuously and concurrently filtering and treating liquids in which the filtering operation occurs independently and in series with the treating operation.

These and other objects of the present invention will become apparent from a reading of the attached specification and appended claims.

To achieve such improvements, my invention is a continuous and concurrent closed filtering and treating device, comprising a filtering mechanism immersed in a tank of liquid (fryer), a treating mechanism situated external to said tank, and a suction pump which draws liquid (cooking oil) from the reservoir through the filtering mechanism, through the treating mechanism, and pumps it back into the tank. The filtering mechanism comprises a wire mesh envelope, including at least one wire mesh filter screen for filtering the cooking oil, an insert disposed within the wire mesh envelope supporting the wire mesh envelope and providing fluid communication therethrough, and a frame which holds the wire mesh envelope and the insert together. The treating mechanism is a vessel in one embodiment and a container in another embodiment and is provided with an inlet and an outlet and a selectively removably attached top. Treating material is disposed within the treating mechanism. Cooking oil is pumped through the treating mechanism thereby contacting the treating material disposed within the treating mechanism. Treating material comprises any material, such as activated carbon, which upon contact with the cooking oil can extend the usable life of the cooking oil.

BRIEF DESCRIPTION OF THE DRAWINGS

FIG. 1 is an isometric view of the filtering mechanism of the present invention immersed in a tank.

FIG. 2 is an exploded view of the filtering mechanism of the present invention.

FIG. 3 is a cross-sectional view along line 3—3 of FIG. 1.

FIG. 4 is a cross-sectional view at line 4—4 of FIG. 2.

FIG. 5 is an exploded view of the center of the wire mesh screen, the center of the inner frame, washers, and upper and lower caps.

FIG. 8 is a side cross-sectional view of one embodiment of the treating mechanism.

FIG. 9 is a cross-sectional view of one embodiment of the treating mechanism at line 9—9 of FIG. 8.

FIG. 10 is an isometric, partial cutaway view of one embodiment of the treating mechanism.

FIG. 11 is an isometric view of a second embodiment of the treating mechanism.

FIG. 12 is an isometric view of a receptacle for use with the second embodiment.

FIG. 13 is a top view of pouches filled with treating material.

DETAILED DESCRIPTION OF THE INVENTION

Figure 6:
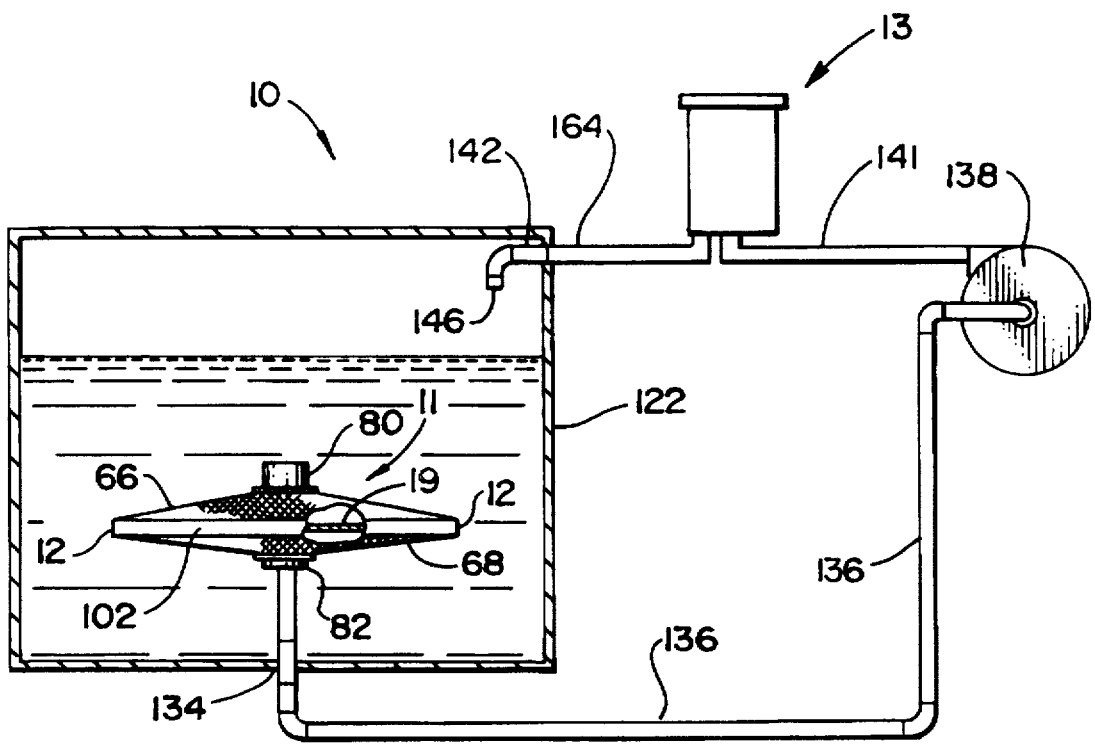
FIG. 6 is a schematic of the present invention with the filtering mechanism immersed in a tank and the treating mechanism situated intermediate a pump and the inlet flow line of the tank.
Figure 7:
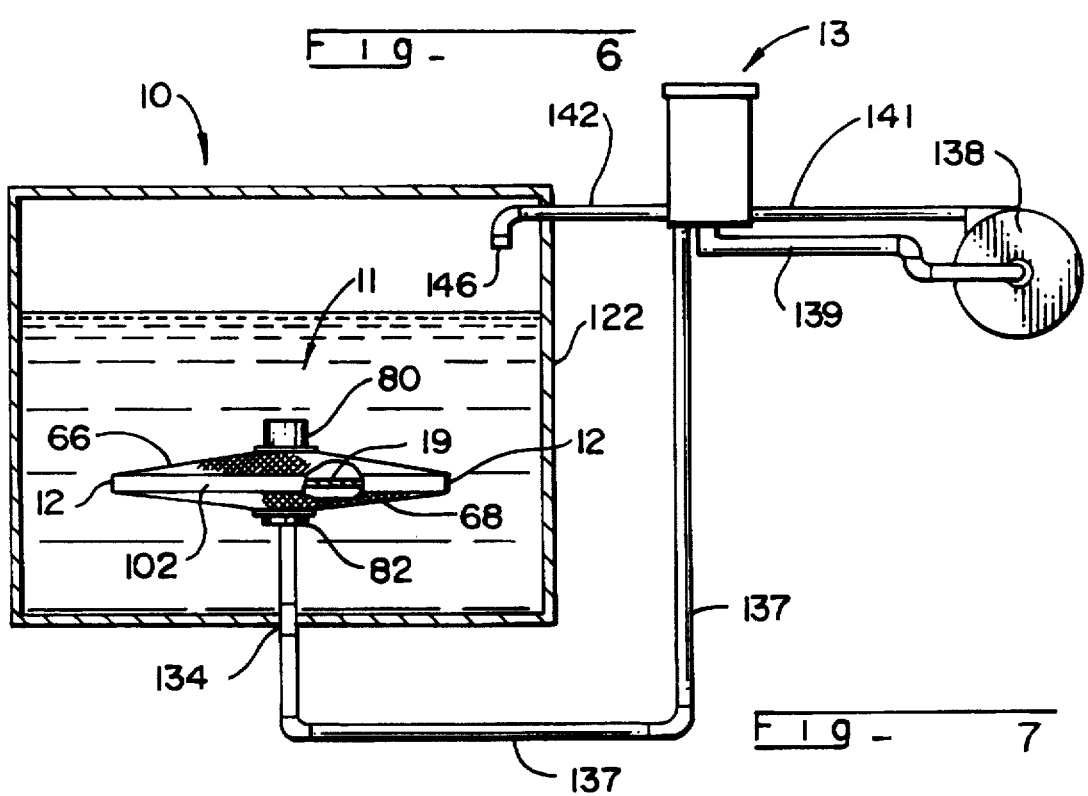
FIG. 7 is a schematic of the present invention with the filtering mechanism immersed in a tank and the treating mechanism situated intermediate a pump and the outlet port of the tank.

Referring first to FIGS. 6 and 7, there is shown at 10 the filtering and treating device of the present invention in one embodiment. The principal components of the filtering and treating device 10 comprise a filtering mechanism 11 and a treating mechanism 13. Filtering mechanism 11 is located within a tank 122 while treating mechanism 13 is located external to tank 122.

Referring to FIGS. 2 and 3, filtering mechanism 11 generally comprises a wire mesh envelope 12, a filter insert 19, a first cap 82, and a second cap 80. As best seen in FIGS. 2, 3, and 5, insert 19 is generally rectangular in shape and contains sufficient voids to allow the free flow of fluids therethrough, both vertically and laterally. A metallic plate having a tubular slit grid has been proven to be a material which is suitably rigid at temperatures incurred in cooking oil applications. The tubular slit grid is formed generally by providing parallel slits in the metallic plate and deforming the area between the slits to provide alternately raised and lowered sections of material. The tubular slit grid provides passageways for a vertical and lateral fluid travel. Insert 19 also includes a central opening 184 in its center.

The dimensions of insert 19 are sized and manufactured to allow insert 19 to be inserted into wire mesh envelope 12. FIG. 2 shows an exploded view of insert 19 within wire mesh envelope 12. Wire mesh envelope 12 includes a first rectangular wire mesh filter screen 66, a second rectangular wire mesh filter screen 68, and a frame 102. The first filter screen 66 and the second filter screen 68 are substantially the same length and width. Insert 19 supports and maintains separation between filter screens 66 and 68.

Frame 250 comprises two c-shaped sections, first frame section 252 and second frame section 254. Frame sections 252 and 254 have a generally u-shaped cross-section. The channel defined by the u-shape cross-section of frame sections 252 and 254 is sized to receive the ends of insert 19 and filter screens 66 and 68. To assemble wire mesh envelope 12, insert 19 is placed between filter screens 66 and 68 and, as a unit, insert 19 and filter screens 66 and 68 are inserted in the u-shape cross-section of first frame section 252. After the unit is completely inserted within first frame section 252 and is securely held together therein, second frame section 254 is inserted on the end of the unit distal first frame section 252 and is pushed towards first frame section 252. Frame sections 252 and 254 also include an attachment means, such as a press-fit interlocking arrangement, providing attachment to each other thereby securely holding the unit therein. After second frame section 254 completely surrounds the unit, frame sections 252 and 254 lock together by way of the attachment means forming a rectangular frame and completing the assembly of wire mesh envelope 12. Thus, the insert 19 and filter screens 66 and 68 are secured by frame sections 252 and 254.

Referring to FIG. 2, an aperture 72 is located centrally of filter screen 66. A like aperture 74 is located centrally of filter screen 68. Upon construction of wire mesh envelope 12, the central opening 184 of insert 19 is aligned with the apertures 72 and 74.

A washer 76 is juxtaposed against the exterior of filter screen 66. A like washer 78 is juxtaposed against the exterior of filter screen 68. Upon construction of wire mesh envelope 12, the annular openings of washers 76 and 78 are located centrally of filter screens 66 and 68 respectively, and are aligned with apertures 72 and 74 respectively.

Details of the assembly of the central portion of the envelope 12 together with insert 19 are depicted in an exploded isometric view, FIG. 5, including a first cap 82, a second cap 80, washers 76 and 78, wire mesh screens 66 and 68, washer members 60 and 62, and insert 19.

Second cap 80 includes a generally flat lip 87 at one end. Second cap 80 also includes an internally-threaded axial passageway 86 therethrough.

First cap 82 includes a head portion 84 and a threaded body portion 83. Threaded body portion 83 has an interior passageway 92 drilled therein which is in fluid communication with the interior passageway of an outlet port 134. The interior threads of second cap 80 engage the male external threads on the body portion 83 of first cap 82. A plurality of ports 94 extend radially through the body portion 83. Ports 94 are in fluid communication with interior passageway 92. And, in the assembled configuration, ports 94 are in fluid communication with the area surrounding insert 19 and interior to envelope 12 such that any suction applied to interior passageway 92 will cause cooking oil to pass through insert 19, through radial ports 94, through interior passageway 92, and through outlet port 134.

In its assembled configuration, washer 78 is juxtaposed between lip 87 of second cap 80 and second mesh screen 68. In its assembled configuration, washer 76 is juxtaposed between first mesh screen 66 and the head portion 84 of first cap 82.

Washer 62 is interposed between insert 19 and first mesh screen 66. Similarly, washer 60 is interposed between insert 19 and second mesh screen 68. Washers 60 and 62 provide suitable separation between insert 19 and mesh screens 66 and 68. The central opening 184 of insert 19 and the annular openings of washers 60 and 62 accommodate body portion 83 of the first cap 82. As shown in FIG. 3, as the first cap 82 is tightened within the threads of the second cap 80, the elements of the device 10 are drawn together in a sandwiched configuration. Those elements, as embodied in FIG. 3, include first cap 82, washer 76, wire mesh screen 66, washer 62, insert 19, washer 60, wire mesh screen 68, washer 78, and second cap 80.

Referring to FIGS. 8–10, in this embodiment, treating mechanism 13 comprises an enclosed vessel 105 which contains treating material 42. The vessel 105 is manufactured from a solid, rigid material, such as stainless steel. The treating material 42 may comprise any material capable, upon contact with the cooking oil, of enhancing the performance attributes and properties of the cooking oil, such as activated carbon.

Referring to FIGS. 6 and 7, vessel 105 is in fluid communication with tank 122 by means of piping and may be situated either intermediate pump 138 and inlet port line 142 (on the pressure side of pump 138) or intermediate outlet port 134 of tank 122 and pump 138 (on the vacuum/suction side of pump 138).

Again referring to FIGS. 8–10, vessel 105 includes a vessel inlet 150, a vessel outlet 152, a vessel top 154, a vessel bottom 156, and a wall 158. In the preferred embodiment, vessel 105 is cylindrical in shape, and vessel inlet 150 and vessel outlet 152 are contained at vessel bottom 156. Vessel 105 should be positioned so that its vertical axis (not shown) is generally normal to the ground (not shown).

In the preferred embodiment, the interior of vessel 105 includes two zones: a first zone 166 and a second zone 168. The first zone 166 is defined by a tubular member 170 which extends from the lower end wall 157 of the vessel 105 to the upper end wall 159 of the vessel 105 and is concentric with the vertical axis (not shown) of vessel 105. The diameter of the tubular member 170 is smaller than the diameter of vessel 105. Second zone 168 is defined by tubular member 170 and wall 158 of vessel 105.

Vessel inlet 150, located at vessel bottom 156, is in fluid communication with first zone 166. Vessel outlet 152, located at vessel bottom 156, is in fluid communication with second zone 168.

Second zone 168 is divided into sections 172 by non-permeable dividers 174. Dividers 174 extend vertically within second zone 168 from vessel top 154 to vessel bottom 156. Dividers 174 are spaced equally within second zone 168. The number of dividers 174 used within vessel 105 depends on the specific application of the filtering and treating device 10.

At the tubular member 170 end adjacent vessel top 154, tubular member 170 is provided with apertures 176. Apertures 176 allow for fluid communication between tubular member 170 and each section 172 of second zone 168. The size and number of apertures 176 may vary with specific application to determine the flow rate of cooking oil through device 10 and will thus be designed to provide the optimum flow rate for each different application of device 10.

At the divider 174 ends which are adjacent to vessel bottom 156, dividers 174 are provided with passages 178. Passages 178 allow fluid communication among sections 172.

Vessel outlet 152, located at vessel bottom 156, is in fluid communication with second zone 168. Passages 178 allow for the cooking oil to flow from sections 172 of vessel 105 and to exit vessel 105 through vessel outlet 152.

Treating material 42 is placed within each section 172. In one embodiment, as shown in FIG. 8, treating material 42 is placed in baskets 180 sized to be positioned within sections 172, one basket 180 per section 172. Baskets 180 may be manufactured from any material permeable to cooking oil but impermeable to dislodged treating material 42, such as wire mesh. In another embodiment (not shown), treating material 42 is freely placed within sections 172. In such an embodiment, a vessel screen 182, as shown in FIG. 9, is selectively removably attached to vessel outlet 152 (either on the inside or outside of vessel 105) by way of conventional attachment means, such as a hook. Vessel screen 182 covers vessel outlet 152 to ensure that no small particles from treating material 42 escape vessel 105 as the oil flows through treating material 42 and vessel 105. In another embodiment (not shown), pouches 18 filled with treating material 42 (as shown in FIG. 13) are placed within sections 172 or baskets 180.

Pouches 18, in the preferred embodiment and as shown in FIG. 13, are constructed of a woven material permeable to liquids. Pouches 18 are closed around their perimeter and contain treating material 42 for treatment of liquids flowing through pouches 18.

The use of baskets 180 in vessel 105 aids in and eases the replacement of treating material 42. When vessel 105 holds only one pouch 18 filled with treating material 42, the use of baskets 180 is not needed since it is convenient to simply remove the single pouch 18 after use and replace it with another new pouch 18 without the need of a basket 180. However, in situations when more than one pouch 18 is utilized or when the treating material 42 is loose within vessel 105 (i.e. treating material 42 not held in pouches 18), it is beneficial to place the pouches 18/treating material 42 in baskets 180. In this second situation, baskets 180 contribute to the ease and cleanliness of the treating material 42 changing procedure since the entire basket 180 may be removed from vessel 105 thereby allowing for a quick replacement of all pouches 18/treating material 42 within baskets 180.

Vessel top 154 is removably attached to vessel 105. In a preferred embodiment, vessel top 154 is connected by threading to the upper end wall 159 to allow convenient removal of vessel top 154.

Referring to FIGS. 8 and 9, a vessel accessory connection 230 is provided on vessel top 154. If vessel 105 is situated intermediate pump 138 and inlet port line 142 (on the pressure side of pump 138), the vessel accessory connection 230 may provide connection, by any conventional means such as threading, to a pressure relief valve (not shown) and/or a pressure gauge (not shown). The pressure relief valve and pressure gauge are both conventional and are well-known in the art. If a pressure relief valve is used, the pressure relief valve may be opened to relieve any excess pressure which has accumulated within vessel 105. The pressure relief valve, upon opening, would also facilitate draining of vessel 105. If a pressure gauge is used, the pressure gauge would measure the pressure within the filtering and treating device 10 at vessel 105. If vessel 105 is situated intermediate outlet port 134 and pump 138 (on the vacuum/suction side of pump 138), the vessel accessory connection 230 may provide connection, by any conventional means such as threading, to a vacuum gauge (not shown). The vacuum gauge is conventional and well-known in the art. The vacuum gauge would measure the vacuum pressure in the filtering and treating device 10 between the filtering mechanism 11 and the pump 138.

Referring to FIG. 6, in one embodiment, vessel 105 is situated intermediate pump 138 and inlet port line 142 (on the pressure side of pump 138). Vessel inlet 150 is connected to pump 138 outlet header 141. Such connection may be a releasable connection such as a quick-release connecting device for piping or hoses which are commercially available to allow removal of vessel 105. Vessel inlet 150 and header 141 provide fluid communication between pump 138 and vessel 105. Vessel outlet 152 is connected by pipe 164 to inlet flow line 142, such inlet flow line connected to inlet port 146. Such connection may be a releasable connection to allow removal of vessel 105. Vessel outlet 152 and pipe 164 provide fluid communication between inlet flow line 142 and vessel 105. In this embodiment, outlet port 134 is connected to pump 138 by pipe 136.

Referring to FIG. 7, in another embodiment, vessel 105 is situated intermediate outlet port 134 of tank 122 and pump 138 (on the vacuum/suction side of pump 138). Vessel inlet 150 is connected to pipe 137, which is in turn connected to outlet port 134. Such connection between vessel inlet 150 and pipe 137 may be a releasable connection such as a quick-release connecting device for piping or hoses which are commercially available to allow removal of vessel 105. Vessel inlet 150 and pipe 137 provide fluid communication between outlet port 134 of tank 122 and vessel 105. Vessel outlet 152 is connected by pipe 139 to pump 138. Such connection may be a releasable connection to allow removal of vessel 105. Vessel outlet 152 and pipe 139 provide fluid communication between vessel 105 and pump 138.

Referring now to FIG. 6 or FIG. 7, filtering mechanism 11 of the present invention is disposed in a fryer 120. Treating mechanism 13 of the present invention is external to fryer 120 and is in fluid communication with the rest of the system. Fryer 120 includes a tank 122 and heating elements 126. Filtering mechanism 11 is disposed within tank 122.

Second cap 80 is connected to an outlet port 134 extending exterior of tank 122. Such connection may be a permanent connection such as by welding or a releasable connection such as by threading to allow removal of second cap 80 as desired. As previously disclosed, fluid communication between outlet port 134 and inlet flow line 142 is provided in either of two ways: [1] by connecting outlet port 134 to pipe 136 to pump 138 to header 141 to vessel 105 to pipe 164 and to inlet flow line 142 (as shown in FIG. 6); or [2] by connecting outlet port 134 to pipe 137 to vessel 105 to pipe 139 to pump 138 to header 141 and to inlet flow line 142 (as shown in FIG. 7). Either embodiment is functional.

In use, filtering mechanism 11 is disposed in tank 122 and tank 122 is filled to a predetermined level with cooking oil (not shown). Upon activation of pump 138 a suction is created in interior passageway 86 drawing cooking oil from within the interior of tank 122 through wire mesh envelope 12, through filter insert 19, throughports 94, through first cap interior passageway 92, and into second cap interior passageway 86. Pump 138 circulates the cooking oil from interior passageway 86 through outlet port 134, through treating mechanism 13, and back into tank 122 through inlet port 146.

Upon such circulation, the particulate matter within the cooking oil contained within tank 122 will accumulate on filter screens 66 and 68. Concurrently, pump 138 circulates the oil into and through treating mechanism 13. In treating mechanism 13, the oil enters vessel 105 through vessel inlet 150 and is pumped vertically upwards through tubular member 170. The oil then passes into sections 172 of second zone 168 through apertures 176 provided in tubular member 170. The oil then descend within sections 172. As the oil descends within sections 172, the oil is exposed to treating material 42, which imparts desired characteristics to the cooking oil.

Cooking oil may be pumped from the interior of tank 122 and returned into the interior of tank 122 in a continual manner while the fryer is in use. Suitable pump control means and pressure measurement means are provided to control the flow of cooking oil. Such control means and pressure measurement means are not depicted as they comprise conventional electrical controllers and pressure and/or vacuum gauges.

In use, suspended solid particles contained in the cooking oil will accumulate on the outer surfaces of mesh screens 66 and 68. It has been found that, over time, the accumulation of particles forms a filter cake (not shown) which serves to filter the cooking oil. Very small flow paths will form through the filter cake as it accumulates on the exterior surfaces of screens 66 and 68. Filter screens 66 and 68 effectively filter the cooking oil.

A filter powder may be added to the cooking oil. The filter powder may be comprised of a diatomaceous earth, perlite, a chemical mixture or a combination of these. As the filter powder is added to the cooking oil, the filtering and treating device 10 draws the filter powder such that it rests in surface-to-surface contact with the outer screens 66 and 68. The flow path of the cooking oil and the composition of the filter powder causes the filter powder to aggregate at the outer surfaces of the screens 66 and 68, forming filter cake. The filter cake may be comprised of a combination of filter powder and comestible particulate matter or alternatively, simply comestible particulate matter. The suction applied by the pump to the filtering mechanism 11 maintains fluidic channels within said filter cake allowing for the continued filtering of the cooking oil.

The use of sections 172 within second zone 168 of vessel 105 allows for the uniform downward flow of the oil within second zone 168 by inhibiting radial or horizontal flow of the oil as it descends within sections 172. Furthermore, the use of sections 172 allows for the containment of treating material 42 into equally divided units and increases the frequency of oil and treating material 42 contact.

Upon reaching vessel bottom 156 within sections 172, the oil flows from section 172 to section 172 through passages 178 in dividers 174 until reaching the section 172 containing vessel outlet 152. The oil then exits vessel 105 through vessel outlet 152.

In operation and generally speaking, treating material 42 is replaced, when its useful life has expired, by removing vessel top 154, removing the used treating material 42, and replacing it with replacement treating material 42.

As shown in FIG. 8, in the embodiment in which baskets 180 are utilized to hold treating material 42 or pouches 18, treating material 4/pouches 18 are replaced by removing vessel top 154 from vessel 105, removing baskets 180 from vessel 105, removing treating material 42/pouches 18 from baskets 180, and replacing used treating material 42/pouches 18 with replacement treating material 42/pouches 18.

In the embodiment in which pouches 18 filled with treating material 42 are placed in sections 172 without the use of baskets 180, treating material 42 is replaced by removing vessel top 152 from vessel 105, removing pouches 18 from vessel 105, and replacing used pouches 18 with replacement pouches 18.

In the embodiment in which treating material 42 is freely placed in sections 172 (this embodiment is not preferred), vessel 105 may be removed in order to replace treating material 42. Vessel bottom 156 is releasably attached to either [1] header 141 at vessel inlet 150 and to pipe 164 at vessel outlet 152 (as in FIG. 6) or to [2] pipe 137 at vessel inlet 150 and to pipe 139 at vessel outlet 152 (as in FIG. 7). After detaching vessel outlet 152 and vessel inlet 150 from their respective connections, vessel 105 is removed, and with the vessel top 154 dislodged, vessel 105 is tilted to allow the escape of treating material 42 from sections 172. Once the used treating material 42 is out of vessel 105, new treating material 42 is placed within sections 172.

The oil should be drained from vessel 105 prior to detaching vessel 105 or one of its component parts. Since, as shown in FIGS. 6 and 7, vessel 105 is located above the level of the cooking oil 30 within tank 122, the oil inside vessel 105 drains out of vessel 105, through vessel inlet 150 and vessel outlet 152, by gravity once the pump 138 is deactivated. In an alternative embodiment, a by-pass (not shown) may be utilized to allow the removal of vessel 105 while pump is still activated. The by-pass comprises conventional, commercially available valves and piping to allow the fluid to be pumped through a connecting pipe (not shown) and not through the treating mechanism 13. The by-pass detours the flow of the oil away from vessel 105 essentially cutting off vessel 105 from the circulation induced by pump 138. The by-pass includes a by-pass valve (not shown) and a by-pass pipe line (not shown) sufficient to provide fluid communication from prior to vessel inlet 150 to immediately after vessel outlet 152.

ALTERNATIVE EMBODIMENT

In an alternative embodiment, as shown in FIGS. 11 and 12, device 10 is generally as disclosed in the previous embodiment, but treating mechanism 13 comprises a container 200. Like vessel 105, container 200 is manufactured from a solid, rigid material, such as stainless steel. Also like vessel 105, container 200 is in fluid communication with tank 122 by means of piping and may be situated either intermediate pump 138 and inlet port line 142 (on the pressure side of pump 138 as shown in FIG. 6) or intermediate outlet port 134 of tank 122 and pump 138 (on the vacuum/suction side of pump 138 as shown in FIG. 7).

Container 200 comprises a generally rectangular shape and includes a container inlet 202, a container outlet 204, a container top 206, a container bottom 208, a first pair of opposing side walls 210, and a second pair of opposing side walls 212. Container inlet 202 is included on one of the first pair of opposing side walls 210 and is near container bottom 208. Container outlet 204 is included on the other of the first pair of opposing side walls 210 and is near container top 206. Thus, container outlet 204 is situated at a higher level than container inlet 202.

Depending on the treating material type and particle size used, a receptacle 214 may be removably positioned in container box 200. One of the benefits of using receptacle 214 is to aid in and ease the replacement of treating material 42. When container 200 holds only one pouch 18 filled with treating material 42, the use of receptacle 214 is not needed since it is convenient to simply remove the single pouch 18 after use and replace it with another new pouch 18 without the need of a receptacle 214. However, in situations when more than one pouch 18 is utilized or when the treating material is loose within container 200 (i.e. treating material not held in pouches 18), it is beneficial to place the pouches/treating material in receptacle 214. In this second situation, receptacle 214 contributes to the ease and cleanliness of the treating material changing procedure since the entire receptacle 214 may be removed from container 200 thereby allowing for a quick replacement of all pouches/treating material within receptacle 214. In the embodiment in which treating material 42 is freely placed in receptacle 214 or container 200, a container screen 183 is selectively removably attached to container outlet 204 and container inlet 202 (either inside or outside of container 200) by conventional attachment means, such as a hook. Container screen 183 covers container outlet 204 and container inlet 202 to ensure that no small particles from treating material 42 escape container 204 as the oil flows through treating material 42 and container 200.

Receptacle 214 is basket-shaped and includes a first and second pair of opposing side walls 216 and 218 and a receptacle bottom 219. Receptacle 214 is constructed from a material which is permeable to said cooking oil, such as wire mesh or perforated sheet. Once receptacle 214 is positioned within container 200, receptacle bottom 219 is adjacent container bottom 208, container first pair of opposing side walls 210 are adjacent receptacle first pair of opposing side walls 216, and container second pair of opposing side walls 212 are adjacent receptacle second pair of opposing side walls 218.

Receptacle 214 is divided into chambers 220 by sectional walls 222. Sectional walls 222 span from container bottom 208 to container top 206, and extend the distance between the receptacle 214's first pair of opposing side walls 216, and are generally parallel to the receptacle 214's second pair of opposing side walls 218. The number of sectional walls 222 and chambers 220 provided within container 200 depends on the specific application of device 10. Openings 224 are provided in sectional walls 222 so as to allow fluid communication between chambers 220.

Pouches 18 are filled with treating material 42 and are disposed within chambers 220 (not shown). In the preferred embodiment, as shown in FIG. 13, pouches 18 are constructed of a woven material permeable to liquids. Pouches 18 are closed around their perimeter and contain treating material 42 for treating of liquids flowing through pouches 18.

Container top 206 is removably attached to container 200. In a preferred embodiment, container top 206 is connected by clamping means (not shown) to container 200 to allow convenient removal of container top 206 from container 200.

Referring to FIG. 11, a container accessory connection 240 is provided on container top 206. If container 200 is situated intermediate pump 138 and inlet port line 142 (on the pressure side of pump 138), the container accessory connection 240 may provide connection, by any conventional means such as threading, to a pressure relief valve (not shown) and/or a pressure gauge (not shown). The pressure relief valve and pressure gauge are both conventional and are well-known in the art. If a pressure relief valve is used, the pressure relief valve may be opened to relieve any excess pressure which has accumulated within container 200. The pressure relief valve, upon opening, would also facilitate draining of container 200. If a pressure gauge is used, the pressure gauge would measure the pressure within the filtering and treating device 10 at container 200. If container 200 is situated intermediate outlet port 134 and pump 138 (on the vacuum/suction side of pump 138), the container accessory connection 240 may provide connection, by any conventional means such as threading, to a vacuum gauge (not shown). The vacuum gauge is conventional and well-known in the art. The vacuum gauge would measure the vacuum pressure in the filtering and treating device 10 between the filtering mechanism 11 and the pump 138.

In one embodiment, container 200 is situated intermediate pump 138 an inlet port line 142 (on the pressure side of pump 138). Container inlet 202 is connected to pump 138 outlet header 141. Such connection may be a releasable connection such as a quick-release connecting device for piping or hoses which are commercially available to allow removal of container 200. Container inlet 202 and header 141 provide fluid communication between pump 138 and container 200. Container outlet 204 is connected by pipe 164 to inlet flow line 142, such inlet flow line connected to inlet port 146. Such connection may be a releasable connection to allow removal of container 200. Container outlet 204 and pipe 164 provide fluid communication between inlet flow line 142 and container 200. In this embodiment, outlet port 134 is connected to pump 138 by pipe 136.

In another embodiment, container 200 is situated intermediate outlet port 134 of tank 122 and pump 138 (on the vacuum/suction side of pump 138). Container inlet 202 is connected to pipe 137, which is in turn connected to outlet port 134. Such connection between container inlet 202 and pipe 137 may be a releasable connection such as a quick-release connecting device for piping or hoses which are commercially available to allow removal of container 200. Container inlet 202 and pipe 137 provide fluid communication between outlet port 134 of tank 122 and container 200. Container outlet 204 is connected by pipe 139 to pump 138. Such connection may be a releasable connection to allow removal of container 200. Container outlet 204 and pipe 139 provide fluid communication between container 200 and pump 138.

In this alternative embodiment, the circulation of cooking oil induced by pump 138 through device 10 is as disclosed in the previous embodiment. Upon such circulation, the particulate matter within the cooking oil contained within tank 122 will accumulate on filter screens 66 and 68. Concurrently, pump 138 circulates the oil into and through treating mechanism 13. In treating mechanism 13, the oil enters container 200 through container inlet 202 and is pumped into chambers 220. Openings 224 of sectional walls 222 allow the oil to flow to and from chambers 220. As the oil flows within chambers 220, the oil is treated when it engages permeable pouches 18 containing treating material 42. Since container inlet 202 is situated near container bottom 208 and container outlet 204 is situated near container top 206, container outlet 204 is situated at a level higher than container inlet 202. Thus, before it can exit container 200, the oil must accumulate within container 200 and rise to the level of container outlet 204. In this manner, as it rises within container 200 to the level of container outlet 204, the oil percolates through and is treated by the maximum number of pouches 18 and amount of treating material 42 within container 200. Once it reaches the level of container outlet 204, the oil exits container 200 through container outlet 204. The use of chambers 220 within container 200 allows for the containment of the treating material 42 into equally divided units and increases the frequency of oil and treating material 42 contact.

In operation, treating material 42 is replaced, when its useful life has expired, by removing container top 206 from container 200, removing receptacle 214 from container 200 (if receptacle 214 is used), removing pouches 18/treating material 42 from receptacle 214 (or from container 200 if receptacle 214 is not used), and replacing used pouches 18/treating material 42 with replacement pouches 18/treating material 42. In the embodiment in which treating material 42 is freely placed in container 200 without the use of receptacle 214 (this embodiment is not preferred), then container 200 may be removed in order to replace treating material 42. The procedure for removing container 200 from either [1] header 141 and pipe 164 (as in FIG. 6) or from [2] pipe 137 and pipe 139 (as in FIG. 7) is identical to the corresponding procedure for removing vessel 105 as stated herein in the description of the previous embodiment.

The oil should be drained from container 200 prior to detaching container 200 or one of its component parts. Since, as shown in FIGS. 6 and 7, container 200 is located above the level of the cooking oil 30 within tank 122, the oil inside container 200 drains out of container 200, through container inlet 204, by gravity once pump 138 is deactivated. In an alternative embodiment, a by-pass (not shown) may be utilized to allow the removal of container 200 while pump 138 is still activated. The by-pass comprises conventional, commercially available valves and piping to allow the fluid to be pumped through a connecting pipe (not shown) and not through treating mechanism 13. The by-pass detours the flow of the oil away from container 200 essentially cutting off container 200 from the circulation induced by pump 138. The by-pass includes a by-pass valve (not shown) and a by-pass pipe line (not shown) sufficient to provide fluid communication from prior to container inlet 202 to immediately after container outlet 204.

The foregoing disclosure and description of the invention is illustrative and explanatory thereof. Various changes in the details of the illustrated construction may be made within the scope of the appended claims without departing from the true spirit of the invention. For instance, it is understood that the scope of this invention includes the treating and filtering of other substances, and not just cooking oil disposed in a fryer. The present invention should only be limited by the following claims and their legal equivalents.

I claim:

1. A device for continuous filtering and treating of cooking oil disposed in a fryer comprising:

a fryer tank having a bottom and side walls defining a tank interior;

cooking oil disposed in said tank interior;

at least one inlet port in fluid communication with said tank interior;

filtering mechanism disposed in said tank;

said filtering mechanism attached to an outlet port;

said filtering mechanism including at least one wire mesh screen;

said outlet port in fluid communication with said filtering mechanism;

pump operatively connected to said outlet port;

treating mechanism external of said tank;

said treating mechanism operatively connected to said pump and to said at least one inlet port;

said pump conducting cooking oil from said filtering mechanism to said outlet port to said treating mechanism to said at least one inlet port;

whereby a flow of cooking oil in said tank interior is continuously drawn from said tank through said filtering mechanism and through said treating mechanism and returned to said tank interior through said inlet port.

2. A device as in claim 1 wherein said treating mechanism is situated above the level of said cooking oil in said tank.

3. A device as in claim 2, wherein:

said treating mechanism containing treating material;

said treating material contacting said cooking oil within said treating mechanism; and whereby said cooking oil is treated by said treating material.

4. A device as in claim 3, said treating mechanism including a top; and said top of said treating mechanism being selectively removably attached to said treating mechanism.

5. A device as in claim 4, wherein said treating mechanism comprising a vessel, said vessel including:

a vessel inlet;

a vessel outlet;

at least one zone within said vessel;

each of said at least one zone containing treating material; and each of said at least one zone in fluid communication with each other.

6. A device as in claim 5, wherein said at least one zone including:

a first zone in fluid communication with said vessel inlet; and a second zone in fluid communication with said vessel outlet.

7. A filtering and treating device as in claim 6, wherein:

said vessel further including a vessel bottom and an exterior wall;

a tubular member disposed in said vessel;

said tubular member in fluid communication with said vessel inlet;

said tubular member extending from said vessel bottom to said vessel top;

said first zone comprising the area interior of said tubular member;

said second zone comprising the space between said tubular member and said exterior wall;

a tubular member upper end adjacent to said vessel top having at least one aperture;

thereby providing fluid communication between said tubular member and said second zone; and said second zone in fluid communication with said vessel outlet.

8. A device as in claim 7, wherein:

said second zone comprising at least two compartments;

said at least two compartments defined by at least one divider extending vertically within said second zone from said vessel bottom to said vessel top;

said each of said at least one divider including a divider lower end adjacent to said vessel bottom;

said divider lower end having at least one passage therethrough; and said at least one passage providing fluid communication between each of said at least two compartments.

9. A device as in claim 8, including:

at least one basket selectively removably disposed in each of said at least two compartments;

each of said at least one basket permeable to allow flow of cooking oil therethrough;

said treating material being located within said at least one basket; and said at least one basket impermeable to dislodged particles of said treating material.

10. A device as in claim 9, wherein:

said vessel is generally cylindrical in shape;

said tubular member is concentric with said cylindrical vessel; and said second zone being annular in shape.

11. A device as in claim 4, wherein said treating mechanism comprising a container;

said container including a container inlet and a container outlet; and said container outlet situated at a level higher than said container inlet.

12. A device as in claim 11, wherein said treating mechanism including a receptacle;

said receptacle selectively removably disposed in said container;

said treating material comprising a plurality of pouches filled with treating material;

said plurality of pouches being permeable to allow flow of cooking oil therethrough;

said receptacle being permeable to allow flow of cooking oil therethrough; and thereby providing fluid communication within said container between said container inlet and said container outlet.

13. A device as in claim 12, wherein said receptacle comprising at least two chambers;

said at least two chambers defined by at least one sectional wall;

said at least one sectional wall having a at least one opening therethrough; and said at least one opening providing fluid communication through said at least one sectional wall and between said at least two chambers.

14. A device as in claim 13, wherein:

said container is generally rectangular in shape; and said receptacle is generally basket-like in shape.

15. A device as in claim 1, wherein said treating mechanism is situated on the pressure side of said pump between said pump and said at least one inlet port.

16. A device as in claim 1, wherein said treating mechanism is situated on the suction side of said pump between said outlet port and said pump.

17. A device as in claim 1, wherein said filtering mechanism further comprises:

a first wire mesh filter screen;

a second wire mesh filter screen;

said first and second wire mesh filter screens being substantially the same size;

an insert situated between said first and second wire mesh filter screens;

said insert containing sufficient voids to allow fluid communication therethrough;

said insert being slightly smaller in size than said first and second wire mesh filter screens; and a frame to secure said first wire mesh filter screen, said insert, and said second wire mesh filter screen together.

18. A device as in claim 17, wherein said insert comprises:

a metallic plate having a tubular slit grid;

said tubular slit grid formed by providing parallel slits in said metallic plate and deforming the area between said slits to provide alternately raised and lowered sections of material; and thereby providing said insert with passageways which allow vertical and lateral fluid communication therethrough.

19. A device as in claim 18, wherein said frame comprises:

a first c-shaped frame section;

a second c-shaped frame section;

said first and second c-shaped frame sections having a u-shaped cross-section defining a channel;

said channel sized to receive the ends of said first wire mesh filter screen, said insert, and said second wire mesh filter screen;

said first wire mesh filter screen, said insert, and said second wire mesh filter screen comprising a unit;

said channel of said first c-shaped frame section securing one side of said unit;

said channel of said second c-shaped frame section securing the second side of said unit;

attachment means for attaching said first c-shaped frame section to said second c-shaped frame section while securing said unit; and thereby securely holding said unit together therein.

20. A method of continuously filtering and treating cooking oil wherein the cooking oil is contained within a tank, comprising the steps of:

positioning a filtering mechanism within said tank;

positioning a treating mechanism external to said tank;

positioning piping means in fluid communication with said filtering mechanism and said treating mechanism; and pumping said cooking oil through said filtering mechanism thereby filtering said cooking oil, through said treating mechanism thereby treating said cooking oil, through said piping means, and returning said cooking oil into said tank at a level below the surface of said cooking oil.

21. The method of claim 20 wherein:

said treating mechanism positioning step including placing a vessel external to said tank, said vessel having a vessel inlet, a vessel outlet, and treating material disposed within; and said pumping step including pumping said cooking oil through said filtering mechanism thereby filtering said cooking oil, through said piping means, through said vessel inlet, through said treating material disposed within said vessel thereby treating said cooking oil, through said vessel outlet, and returning said cooking oil into said tank at a level below the surface of said cooking oil.

22. The method of claim 21 wherein:

said vessel positioning step including providing a vessel having a vessel bottom, a vessel top selectively removably attached to said treating mechanism, an exterior wall, a first zone in fluid communication with said vessel inlet, said first zone comprising the area interior a tubular member extending from said vessel bottom to said vessel top, a second zone in fluid communication with said first zone and with said vessel outlet, said second zone comprising the space between said tubular member and said exterior wall, said second zone comprising at least one compartment defined by at least one divider, said at least one divider extending vertically within said second zone from said vessel bottom to said vessel top, said at least one divider having a divider lower end adjacent said vessel bottom, said divider lower end having at least one passage therethrough providing fluid communication between each of said at least two compartments, and treating material disposed within said compartments of said second zone; and said pumping step including pumping said cooking oil through said filtering mechanism thereby filtering said cooking oil, through said piping means, through said vessel inlet, through said first zone, through said at least two compartments and at least one passage of said second zone, through said treating material disposed within said second zone thereby treating said cooking oil, through said vessel outlet, and returning said cooking oil into said tank at a level below the surface of said cooking oil.

23. The method of claim 22, wherein:

said vessel positioning step including providing said vessel with at least one basket disposed in each of said at least one compartment, said at least one basket permeable to allow flow of cooking oil therethrough and impermeable to particles of said treating material, and said treating material being located within said at least one basket; and said pumping step including pumping said cooking oil through said filtering mechanism thereby filtering said cooking oil, through said piping means, through said vessel inlet, through said first zone, through said at least one compartment, at least one basket, and at least one passage of said second zone, through said treating material disposed within said at least one basket of said second zone thereby treating said cooking oil, through said vessel outlet, and returning said cooking oil into said tank at a level below the surface of said cooking oil.

24. The method of claim 20, wherein:

said treating mechanism positioning step including placing a container external to said tank, said container having a container inlet, a container outlet, said container outlet situated at a level higher than said container inlet, and treating material disposed within said container; and said pumping step including pumping said cooking oil through said filtering mechanism thereby filtering said cooking oil, through said piping means, through said container inlet, through said treating material disposed in said container thereby treating said cooking oil, through said container outlet, and returning said cooking oil into said tank at a level below the surface of said cooking oil.

25. The method of claim 24, wherein:

said container positioning step including providing said container with a container top selectively removably attached to said treating mechanism, a receptacle selectively removably disposed in said container, said receptacle permeable to allow flow of cooking oil therethrough, said receptacle comprising at least one chamber and at least one pouch filled with treating material disposed in said chamber, said at least one pouch permeable to allow flow of cooking oil therethrough; and said pumping step including pumping said cooking oil through said filtering mechanism thereby filtering said cooking oil, through said piping means, through said container inlet, through said at least one chamber and at least one opening of said receptacle, through said plurality of pouches filled with treating material, through said container outlet, and returning said cooking oil into said tank at a level below the surface of said cooking oil.

\* \* \* \* \*